United States Patent Office 3,110,710
Patented Nov. 12, 1963

3,110,710
WATER-SOLUBLE DYESTUFFS CONTAINING POLYHYDROXYLATED ALKYLAMINO TRI-AZINE GROUPS
Ian Durham Rattee and Frederick Andrew Waite, Manchester, England, assignors to Imperial Chemical Industries Limited, London, England, a corporation of Great Britain
No Drawing. Filed June 30, 1960, Ser. No. 39,760
Claims priority, application Great Britain July 2, 1959
2 Claims. (Cl. 260—153)

This invention relates to new dyestuffs and more particularly it relates to new water-soluble dyestuffs which are valuable for colouring textile materials.

According to the invention there are provided the new water-soluble dyestuffs which contain at least one sulphonic or carboxylic acid group and which contain at least one group of the formula:

wherein R represents a hydrogen atom or a substituted or unsubstituted alkyl radical or a cycloalkyl radical and Z represents a 1:3:5-triazine or pyrimidine ring which is attached to the nitrogen atom N through a carbon atom of the said ring and which carries at least one group of the formula:

wherein R' represents a hydrogen atom or a substituted or unsubstituted alkyl radical, X represents an alkyl or cycloalkyl radical containing at least two hydroxy groups and optionally containing a keto or aldehydic group, each of the groups of Formula II being attached to a carbon atom of the said ring.

Each of the groups of Formula I, as hereinbefore defined, is attached to a carbon atom present in the dyestuff. The said carbon atom may form part of an aryl residue present in the dyestuff or may form part of an alkyl chain which is directly attached to an aryl residue present in the dyestuff or is attached through a bridging atom or group. As examples of such bridging atoms or groups there may be mentioned —O—, —S—, —NH—

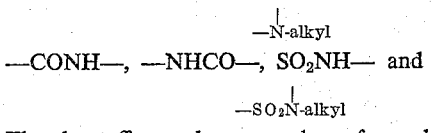

—CONH—, —NHCO—, SO₂NH— and

—SO₂N-alkyl

The dyestuff may be a member of any known dyestuff series and preferably it is a dyestuff of the azo, which may be monoazo or polyazo, nitro, anthraquinone or phthalocyanine series, which contains at least one carboxylic acid or sulphonic acid group. If desired the dyestuff may also contain coordinately bound metal, such as coordinately bound copper, chromium or cobalt.

As examples of the substituted or unsubstituted alkyl radicals represented by R and R' there may be mentioned lower alkyl radicals such as methyl, ethyl, propyl and butyl, and substituted lower alkyl radicals such as hydroxy lower alkyl radicals for example β-hydroxyethyl and β:γ-dihydroxypropyl, alkoxy lower alkyl radicals such as β-ethoxyethyl and β-methoxyethyl and aryl lower alkyl radicals such as benzyl and β-phenylethyl. As an example of a cycloalkyl radical represented by R there may be mentioned cyclohexyl.

As examples of the alkyl radicals containing at least two hydroxy groups represented by X there may be mentioned alkyl radicals of 2 to 6 carbon atoms containing at least two hydroxy groups such as dihydroxypropyl, trihydroxybutyl, tetrahydroxypentyl, pentahydroxyhexyl, tri-(hydroxymethyl)methyl, dihydroxybutyl, dihydroxyhexyl and dihydroxypentyl, and as an example of a cycloalkyl radical containing at least two hydroxy groups represented by X there may be mentioned dihydroxycyclohexyl.

In those cases where the alkyl radical containing at least two hydroxy groups represented by X also contains a keto or aldehydic group and is derived from a carbohydrate containing 5 or 6 carbon atoms then there is a possibility that the said radical will ring close to form a tetrahydropyranyl or tetrahydrofuryl residue.

When the 1:3:5-triazine ring represented by Z carries only one group of Formula II or the pyrimidine ring represented by Z carries less than 3 groups of Formula II then the 1:3:5-triazine ring or pyrimidine ring can carry a further substituent or substituents attached to a carbon atom or atoms of the 1:3:5-triazine or pyrimidine ring. As examples of such substituents there may be mentioned halogen atoms such as chlorine and bromine, mercapto groups, substituted mercapto groups such as methylmercapto, carboxymethylmercapto and phenylmercapto groups, alkyl radicals for example lower alkyl radicals such as methyl and ethyl radicals, aryl radicals such as phenyl and tolyl radicals, hydroxy groups, alkoxy radicals, such as methoxy, ethoxy, propoxy and butoxy radicals, aryloxy radicals such as phenoxy, sulphophenoxy and chlorophenoxy radicals, cyano and thiocyano groups, amino and substituted amino groups such as methylamino, ethylamino, β-hydroxyethylamino, dimethylamino, diethylamino, di-(β-hydroxyethyl)amino, anilino, sulphoanilino, disulphoanilino, carboxyanilino and sulphonaphthylamino groups, and sulphonic acid groups.

According to a further feature of the invention there is provided a process for the manufacture of the new dyestuffs, as hereinbefore defined, which comprises treating a dyestuff compound containing at least one sulphonic or carboxylic acid group and containing at least one group of the formula:

wherein R has the meaning stated above and Z' represents a 1:3:5-triazine or pyrimidine ring which is attached to the nitrogen atom N through a carbon atom of the said ring and which carries at least one halogen atom, which is attached to a carbon atom of the said ring, with an amine of the formula:

wherein R' and X have the meanings stated above.

As examples of the halogen atoms which are attached to the 1:3:5-triazine or pyrimidine ring there may be mentioned bromine and preferably chlorine atoms.

This process of the invention may be conveniently brought about by adding an aqueous solution or suspension of the amine to a solution of the dyestuff compound containing at least one group of the Formula III in water or in a mixture of water and a water-miscible organic liquid, stirring the mixture so obtained, preferably at a temperature between 20° and 90° C., if necessary adding sodium carbonate to maintain the pH of the mixture between 5 and 10, and filtering off the dyestuff which is precipitated. If desired sodium chloride can be added to ensure complete precipitation of all the dyestuff.

When the pyrimidine ring represented by Z' carries two or three halogen atoms or the 1:3:5-triazine ring represented by Z' carries two halogen atoms then it is possible by suitable choice of the reaction conditions to replace one or more of the said halogen atoms by a group or groups of Formula II. In general it is found that the use of higher temperatures and an excess of the amine results in replacement of more than one of the said halogen atoms by the group of Formula II.

As examples of amines of Formula IV which may be used in this process of the invention there may be mentioned N-methyl-N-pentahydroxy-n-hexylamine (which is also known as N-methyl-glucamine), N-ethylglucamine, N-n-propylglucamine, N-isopropylglucamine, N-(β-hydroxyethyl)glucamine, N-methyl - N - (β:γ-dihydroxypropyl)amine, α-D-glucosamine, 2-amino-2-hydroxymethyl-1:3 propanediol and β:γ-dihydroxypropylamine.

The dyestuff compounds containing at least one group of Formula III may themselves be obtained by reacting a dyestuff compound containing at least one sulphonic or carboxylic acid group and containing at least one —NHR group, wherein R has the meaning stated above, with a 1:3:5-triazine or pyrimidine carrying at least 2 halogen atoms.

As specific examples of the said pyrimidine or 1:3:5-triazines which may be used to obtain the dyestuff compounds containing at least one group of Formula III there may be mentioned cyanuric chloride, cyanuric bromide, 2:4-dichloro-1:3:5 - triazine, 2 - methoxy - 4:6 - dichloro-1:3:5-triazine, 2-methyl-4:6-dichloro - 1:3:5 - triazine, 2-phenoxy-4:6-dichloro-1:3:5-triazine, 2-amino-4:6-dichloro-1:3:5-triazine, 2-anilino-4:6-dichloro-1:3:5-triazine, 2-phenylmercapto-4:6-dichloro-1:3:5-triazine, 2-hydroxy-4:6-dichloro-1:3:5-triazine, 2 - thiocyano - 4:6 - dichloro-1:3:5-triazine, 2-dimethylamino-4:6-dichloro-1:3:5-triazine, 2:4:6-trichloropyrimidine, 2:4:6-tribromopyrimidine, 2:4:5:6 - tetrabromopyrimidine, 2:4:5:6-tetrachloropyrimidine, 2:4:6-trichloro-5-nitropyrimidine, 2:4-dichloropyrimidine, 2:4-dichloro-5-nitro-6-methylpyrimidine and 2:4-dichloro-5-nitropyrimidine.

As examples of dyestuff compounds containing at least one —NHR group, as hereinbefore defined, which may be used to obtain the dyestuff compounds containing at least one group of Formula III there may be mentioned the dyestuff compounds of the following classes without, however, limiting the classes to those specifically described.

(1) Monoazo compounds of the formula:

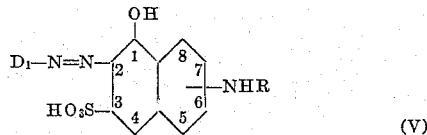

(V)

wherein $D_1$ represents an at most di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetylamino and alkoxy radicals such as methoxy.

(2) Disazo compounds of Formula V, wherein $D_1$ stands for a radical of the azobenzene, azonaphthalene or phenylazonaphthalene series and the naphthalene nucleus is substituted by the NHR group, and optionally by sulphonic acid as in class 1.

(3) Monoazo compounds of the formula:

wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups.

(4) Mono- or dis-azo compounds of the formula:

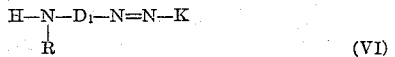

(VI)

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(5) Mono or dis-azo compounds of the formula:

(VII)

wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in α-position to the azo group.

(6) The metal complex, e.g. the copper chromium and cobalt complex, compounds of those dyes of Formulae IV, VI and VII (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

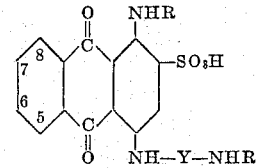

wherein the anthraquinone nucleus may contain an additional sulphonic acid group in the 5-, 6-, 7- or 8-position and Y represents a bridging group which is preferably a divalent radical of the benzene series, for example phenylene, diphenylene, or 4,4'-divalent stilbene or azobenzene radicals. It is preferred that Y should contain one sulphonic acid group for each benzene ring present.

(8) Phthalocyanine compounds of the formula:

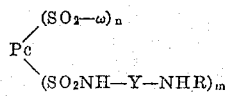

wherein Pc represents the phthalocyanine nucleus preferably of copper phthalocyanine, ω represents —OH and/or —NH₂, Y represents a bridging group, preferably an aliphatic, cycloaliphatic or aromatic bridging group, $n$ and $m$ each represent 1, 2 or 3 and may be the same or different provided that $n+m$ is not greater than 4.

(9) Nitro dyestuffs of the formula:

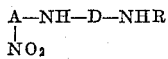

wherein A and B represent monocyclic aryl nuclei which contain at least one sulphonic or carboxylic acid group, the nitro group in A being ortho to the NH group.

In class 1:
6-amino-1-hydroxy-2-(2'-sulphophenylazo)naphthalene-3-sulphonic acid,
6-methylamino-1-hydroxy-2-(4'-acetylamino-2'-sulphophenylazo)naphthalene-3-sulphonic acid,
8-amino-1-hydroxy-2-(2'-sulphophenylazo)naphthalene-3:6-disulphonic acid,
8-amino-1-hydroxy-2-(4'-chloro-2'-sulphophenylazo)naphthalene-3:5-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)-naphthalene-3:6-disulphonic acid,
8-amino-1-hydroxy-2:2'-azonaphthalene-1':3:5':6-tetrasulphonic acid,
8-amino-1-hydroxy-2:2'-azonaphthalene-1':3:5'-trisulphonic acid,
6-amino-1-hydroxy 2:2'-azonaphthalene1',3,5'-trisulphonic acid,
6-methylamino-1-hydroxy-2:2'-azonaphthalene-1',3,5'-trisulphonic acid,
7-amino-1-hydroxy-2,2'-azonaphthalene-1',3-disulphonic acid,
8-amino-1-hydroxy-2-(4'-hydroxy-3'-carboxyphenylazo)naphthalene-3,6-disulphonic acid,
6-amino-1-hydroxy-2-(4'-hydroxy-3'-carboxyphenylazo)naphthalene-3,5-disulphonic acid.

In class 2:
8-amino-1-hydroxy-2-[4'-(2''-sulphophenylazo)-2'-methoxy-5'-methylphenylazo]naphthalene-3,6-disulphonic acid,
8-amino-1-hydroxy - 2 - [4'-(4''-methoxyphenylazo)-2-carboxyphenylazo]naphthalene-3,6-disulphonic acid,
8-amino-1-hydroxy-2-[4'-(2''-hydroxy-3'',6''-disulpho-1''-naphthylazo)-2'-carboxyphenylazo]naphthalene-3,6-disulphonic acid,
4,4'-bis(8''-amino-1''-hydroxy-3'',6''-disulpho-2''-naphthylazo)-3,3'-dimethoxydiphenyl,
6-amino-1-hydroxy-2-[4'-(2''-sulphophenylazo)-2'-methoxy-5'-methylphenylazo]naphthalene-3,5-disulphonic acid.

In class 3:
2-(4'-amino-2'-methylphenylazo)naphthalene-4:8-disulphonic acid.
2-(4'-amino-2'-acetylaminophenylazo)naphthalene-5:7-disulphonic acid,
4-nitro-4'-(4''-methylaminophenylazo)stilbene-2,2'-disulphonic acid,
4-nitro-4'-(4''-amino-2''-methyl-5''-methoxyphenylazo)stilbene-2:2'-disulphonic acid,
4-amino-4'-(4''-methoxyphenylazo)stilbene-2,2'-disulphonic acid,
4-amino-2-methylazobenzene-2':5'-disulphonic acid.

In class 4:
1-(2',5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1''-phenyl-4''-pyrazol-5''-onylazo) stilbene-2,2'-disulphonic acid,
4-amino-4'-(2''-hydroxy-3'',6''-disulpho-1''-naphthylazo)stilbene-2,2'-disulphonic acid,
8-acetylamino-1-hydroxy-2-(3'-amino-4'-sulphophenylazo)naphthalene-3,6-disulphonic acid,
7-(3'-sulphophenylamino)-1-hydroxy-2-(4'-amino-2'-carboxyphenylazo)naphthalene-3-sulphonic acid,
8-phenylamino-1-hydroxy-2-(4'-amino-2'-sulphophenylazo)naphthalene-3,6-disulphonic acid,
6-acetylamino-1-hydroxy-2-(5'-amino-2'-sulphophenylazo)naphthalene-3-sulphonic acid.

In class 5:
1-(3'-aminophenyl)-3-methyl-4-(2':5'-disulphophenylazo)-5-pyrazolone,
1-(3'-aminophenyl)-3-carboxy-4-(2'-carboxy-4'-sulphophenylazo)-5-pyrazolone,
4-amino-4'-[3''-methyl-4''(2''',5'''-disulphophenylazo)-1''-pyrazol-5''-onyl]stilbene-2,2'-disulphonic acid,
1-(3'-aminophenyl)-3-carboxy-4-[4''-(2''',5'''-disulphophenylazo)-2''-methoxy-5''-methylphenylazo]-5-pyrazolone.

In class 6:
The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3,5-disulphonic acid,
The copper complex of 8-amino-1-hydroxy-2-(2'-hydroxy-3'-chloro-5'-sulphophenylazo)naphthalene-3,6-disulphonic acid,
The copper complex of 6-methylamino-1-hydroxy-2-(2'-carboxy-5'-sulphophenylazo)naphthalene-3-sulphonic acid,
The copper complex of 8-amino-1-hydroxy-2-[4'-(2''-sulphophenylazo)-2'-methoxy-5'-methylphenylazo]naphthalene-3,6-disulphonic acid,
The copper complex of 6-amino-1-hydroxy-2-[4'-(2'',5''-disulphophenylazo)-2'-methoxy-5'-methylphenylazo]naphthalene-3,5-disulphonic acid,
The copper complex of 1-(3'-amino-4'-sulphophenyl)-3-methyl-4-[4''-(2''',5'''-disulphophenylazo)-2''-methoxy-5''-methylphenylazo]-5-pyrazolone,
The copper complex of 7-(4'-amino-3'-sulphoanilino)-1-hydroxy-2-[4''-(2''',5'''-disulphophenylazo)-2''-methoxy-5''-methylphenylazo]naphthalene-3-sulphonic acid,
The copper complex of 6-(4'-amino-3'-sulphoanilino)-1-hydroxy-2-(2''-carboxyphenylazo)naphthalene-3-sulphonic acid,
The 1:2-chromium complex of 7-amino-6'-nitro-1,2'-dihydroxy-2:1'-azonaphthalene-3,4'-disulphonic acid,
The 1:2-chromium complex of 6-amino-1-hydroxy-2-(2'-carboxyphenylazo)naphthalene-3-sulphonic acid,
The 1:2-chromium complex of 8-amino-1-hydroxy-2-(4'-nitro-2'-hydroxyphenylazo)naphthalene-3,6-disulphonic acid,
The 1:2-cobalt complex of 6-(4'-amino-3'-sulphoanilino)-1-hydroxy-2-(5''-chloro-2''-hydroxyphenylazo)naphthalene-3-sulphonic acid,
The 1:2-chromium complex of 1-(3'-amino-4'-sulphophenyl)-3-methyl-4-(2''-hydroxy-4''-sulpho-1''-naphylazo)-5-pyrazolone,
The 1:2-chromium complex of 7-(4'-sulphoanilino)-1-hydroxy-2-(4''-amino-2''-carboxyphenylazo)naphthalene-3-sulphonic acid,
The 1:2-chromium complex of 1-(3'-aminophenyl)-3-methyl-4-(4''-nitro-2''-carboxyphenylazo)-5-pyrazolone.

In class 7:
1-amino-4-(3'-amino-4'-sulphoanilino)anthraquinone-2-sulphonic acid,
1-amino-4-(4'-amino-3'-sulphoanilino)anthraquinone-2,5-disulphonic acid,
1-amino-4-[4'-(4''-amino-3''-sulphophenyl)anilino]anthraquinone-2:5-disulphonic acid,
1-amino-4-[4'(4''-amino-2''-sulphophenylazo)anilinoanthraquinone-2:5-disulphonic acid,
1-amino-4-(4'-methylamino-3'-sulphoanilino)anthraquinone-2-sulphonic acid.

In class 8:
3-(3'-amino-4'-sulphophenyl)sulphamyl copper phthalocyanine tri-3-sulphonic acid,
Di-4-(3'-amino-4'-sulphophenyl)sulphamyl copper phthalocyanine-di-4-sulphonic acid,
3-(3'-aminophenylsulphamyl)-3-sulphamyl-copper phthalocyanine-di-3-sulphonic acid.

In class 9: 4-amino-2'-nitro-diphenylamine-3,4'-disulphonic acid.

Specific examples of dyestuff compounds containing at least one sulphonic or carboxylic acid group and at least one group of Formula III are described in British specifications Nos. 209,723, 298,494, 467,815, 503,609, 772,030, 774,925, 781,930, 785,120, 785,222, 803,473, 805,562, 822,047, 826,405, 828,353, 829,042, 832,400, 834,304, 836,248, 836,647, 837,035 and 837,124, and in Belgian specifications Nos. 556,092, 558,801, 558,816, 558,817, 559,782, 560,839, 563,439, 569,115, 571,942, 572,833, 572,967, 573,299, 573,300, 578,742, 578,932 and 581,401.

According to a further feature of the invention there is provided a modified process for the manufacture of the new water-soluble dyestuffs, as hereinbefore defined, which are water-soluble azo dyestuffs containing at least one sulphonic or carboxylic acid group and at least one group of Formula I, as hereinbefore defined, which comprises diazotising a primary amine and coupling the diazo compound so obtained with a coupling component, the primary amine and the coupling component being so chosen that the resulting azo dyestuff contains at least one sulphonic or carboxylic acid group and at least one group of Formula I.

This modified process of the invention may be conveniently brought about by adding sodium nitrite to a solution or suspension of the primary amine, which may be an aminoazo compound, in a dilute aqueous solution of hydrochloric acid, adding the solution or suspension of the diazo compound to an aqueous solution of the coupling component, adding sodium chloride and filtering off the dyestuff which is precipitated.

The primary amines used in this process of the invention which contain one group of Formula I may be obtained by treating a diamine or the corresponding mono N-acetyl derivative thereof with a 1:3:5-triazine or pyrimidine carrying at least two halogen atoms then with an amine of Formula IV, and subsequently hydrolysing off the N-acetyl group when present.

The coupling components used in this process of the invention which contain at least one group of Formula I may be obtained by treating the corresponding coupling components containing at least one —NHR group, wherein R has the meaning stated above, with a 1:3:5-triazine or pyrimidine carrying at least two halogen atoms and then with an amine of Formula IV.

According to a further feature of the invention there is provided a modified process for the manufacture of the new water-soluble dyestuffs, as hereinbefore defined, wherein the 1:3:5-triazine or pyrimidine ring represented by Z contains a group of Formula II and a hydroxy group, alkoxy radical, aryloxy radical, an alkyl or aryl substituted mercapto group or a substituted or unsubstituted amino group which comprises reacting a new water-soluble dyestuff containing a group of Formula II and a halogen atom attached to the 1:3:5-triazine or pyrimidine ring, with a compound of the formula: D—Q wherein D represents a hydrogen or an alkali metal atom and Q represents a hydroxy group, an alkoxy radical, aryloxy radical, an alkyl or aryl substituted mercapto group or a substituted or unsubstituted amino group.

This modified process of the invention may be conveniently brought about by stirring a mixture of the compound of the formula: D—Q and the new dyestuff, as hereinbefore defined, in water, or in a mixture of water and a water-miscible organic liquid, preferably at a temperature between 20° and 100° C., adding sodium carbonate to maintain the pH of the mixture between 5 and 10, and filtering off the dyestuff which is precipitated. If necessary sodium chloride can be added to ensure complete precipitation of all the dyestuff.

As examples of compounds of the formula: D—Q which may be used in this alternative process of the invention there may be mentioned sodium hydroxide, methanol, phenol, sodium phenate, ammonia, methylamine, diethylamine, aniline and metanilic acid.

The new dyestuffs, as hereinbefore defined, are valuable for colouring cellulose textile materials particularly when applied to the cellulose textile materials in conjunction with a treatment with formaldehyde and/or a resin-forming composition and an acid catalyst, for example by the processes described in Belgian specification No. 573,126.

For this purpose it is preferred to apply an aqueous composition of the dyestuff, formaldehyde and/or a resin-forming composition and an acid catalyst to the cellulose textile materials by either a padding or a printing technique and to subsequently heat the coloured cellulose textile materials at a temperature above 100° C. and preferably at a temperature between 140° C. and 160° C.

As examples of resin-forming compositions which can be used with the new dyestuffs there may be mentioned methylolmelamine, methylolurea, acetals, isocyanates, dimethylolcyclic ethylene urea, dimethylolglyoxal urea, dimethylolcyclic propylene urea, tetra methylolacetylene diurea and methylol triazones, such as are commonly used in textile treatments to give crease resist finishes on textile materials.

As examples of acid catalysts there may be mentioned ammonium dihydrogen phosphate, ammonium thiocyanate, zinc chloride, magnesium chloride, zinc nitrate and amine hydrochlorides such as 2-methyl-2-aminopropanol hydrochloride, and especially polyhydroxylated alkylamine hydrochlorides such as N:N-di(β-hydroxyethyl)amine hydrochloride and N-methylglucamine hydrochloride.

The new dyestuffs, as hereinbefore defined, when applied to cellulose textile materials in conjunction with a treatment with formaldehyde and/or a resin-forming composition and an acid catalyst yield colourations possessing excellent fastness to wet treatments such as washing and perspiration and the coloured cellulose textile materials are resistant to creasing.

One preferred class of the new water-soluble dyestuffs of the invention are the water-soluble dyestuffs which contain one or two groups of the formula:

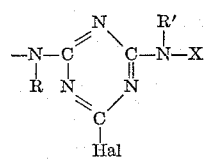

wherein R, R' and X have the meanings stated above and Hal represents a chlorine or a bromine atom. In this preferred class X preferably represents a pentahydroxy-n-hexyl radical.

A second preferred class of the new water-soluble dyestuffs of the invention are the water-soluble dyestuffs which contain one or two groups of the formula:

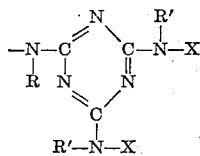

wherein R, R' and X have the meanings stated above. In this preferred class X preferably represents a pentahydroxy-n-hexyl radical.

A third preferred class of the new water-soluble dyestuffs of the invention are the water-soluble dyestuffs which contain one or two groups of the formula:

wherein R has the meaning stated above and $Z_1$ represents a pyrimidine ring which carries one group of the formula

and a chlorine or a bromine atom, wherein R' and X have the meanings stated above. In this preferred class X preferably represents a pentahydroxy-n-hexyl radical.

The invention is illustrated but not limited by the following examples in which the parts and percentages are by weight:

*Example 1.*—A solution of 17.5 parts of the trisodium salt of 2-[8'-hydroxy-7'-(2''-sulphophenylazo)-3':6'-disulphonaphth-1'-ylamino]-4:6-dichloro-1:3:5 - triazine, 5.58 parts of N-methylglycamine and 1.33 parts of sodium carbonate in 500 parts of water is stirred at a temperature between 35° C. and 40° C. for four hours. The solution is then cooled to 20° C., 75 parts of sodium chloride are added and the dyestuff which is precipitated is filtered off and dried.

On analysis the dyestuff so obtained is found to contain 1.09 atoms of organically bound chlorine for each molecule of dyestuff present. When the dyestuff is applied to cellulose textile materials in conjunction with formaldehyde and an acid catalyst and the textile material is subsequently heated or the dyestuff is applied with an aminoplast resin precursor and an acid catalyst and the textile material is subsequently heated, bluish-red shades which are fast to wet treatments are obtained and the cellulose textile materials are simultaneously rendered resistant to creasing.

The trisodium salt of 2-[8'-hydroxy-7'-(2''-sulphophenylazo) - 3':6' - disulphonaphth - 1' - ylamino] - 4:6-dichloro-1:3:5-triazine used in the above example may be obtained by coupling diazotised orthanilic acid with 1-amino-8-naphthol-3:6-disulphonic acid in alkaline medium and condensing the azo compound so obtained with cyanuric chloride in the presence of sodium carbonate.

The following table gives further examples of the new dyestuffs of the invention which are obtained when the 17.5 parts of the trisodium salt of the azo compound used in Example 1 are replaced by an equivalent amount of the sodium salt of the dyestuff compound listed in the second column of the table and/or the 5.58 parts of N-methylglucamine used in Example 1 are replaced by an equivalent amount of the polyhydroxyalkylamine listed in the third column of the table. The fourth column of the table indicates the shade obtained on cellulose textile materials when an aqueous solution containing the dyestuff, a resin-forming composition and an acid catalyst is applied to the textile material which is subsequently heated at a temperature between 140° and 170° C.

| Example | Dyestuff Compound | Polyhydroxyalkylamine | Shade |
|---|---|---|---|
| 2 | 2-[8'-hydroxy-7'-(2''-sulphophenylazo)-3':6'-disulphonaphth-1'-ylamino]-4:6-dichloro-1:3:5-triazine. | 2-amino-2-hydroxymethyl-1:3-propanediol. | Bluish-red. |
| 3 | do | 1-amino-2:3-propanediol | Do. |
| 4 | 2-[8'-hydroxy-7'-phenylazo-3':6'-disulphonaphth-1'-ylamino]-4:6-dibromo-1:3:5-triazine. | do | Do. |
| 5 | do | N-methylglucamine | Do. |
| 6 | 1-(2':5'-dichloro-4'-sulphophenyl)-3-methyl-4-[5''-(4''':6'''-dichloro-1''':3''':5'''-triazin-2'''-ylamino)-2''-sulpho-phenylazo]-5-pyrazolone. | do | Greenish-yellow. |
| 7 | do | N-ethylglucamine | Do. |
| 8 | 2-[4'-(4'':8''-disulphonaphth-2''-ylazo)-3'-methylphenylamino]-4:6-dichloro-1:3:5-triazine. | do | Reddish-yellow. |
| 9 | do | N-methylglucamine | Do. |
| 10 | 2-[5'-hydroxy-6'-(4''-methoxy-2''-sulphophenylazo)-7'-sulphonaphth-2'-ylamino]-4:6-dichloro-1:3:5-triazine. | do | Scarlet. |
| 11 | Copper complex of 2-{6'-[4''-(2''':5'''-disulphophenylazo)-2''-methoxy-5''-methylphenylazo]-5'-hydroxy-1':7'-disulphonaphth 1'-ylamino}-4:6-dichloro-1:3:5-triazine. | do | Navy blue. |

*Example 12.*—A solution of 17.5 parts of the trisodium salt 2-[8'-hydroxy - 7' - (2'' - sulphophenylazo) - 3':6'-disulphonaphth-1'-ylamino] - 4:6 - dichloro - 1:3:5-triazine, 11.16 parts of N-methylglucamine and 2.65 parts of sodium carbonate in 500 parts of water is stirred at a temperature of 45° C. for 1 hour. The solution is then stirred at a temperature of 90° C. for 20 hours. The solution is then cooled to 20° C. and added to a solution of 20 parts of potassium acetate in 1200 parts of ethyl alcohol. The dyestuff which is precipitated is then filtered off and dried. On analysis the dyestuff is found to contain no atoms of organically bound chlorine.

When the dyestuff is applied to cellulose textile materials with formaldehyde and an acid catalyst and the dyeings are subsequently heated or the dyestuff is applied in conjunction with an aminoplast precursor and an acid catalyst and the dyeings are subsequently heated, bluish-red shades which are fast to wet treatments are obtained and the cellulose textile materials are simultaneously rendered resistant to creasing.

The following table gives further examples of the new dyestuffs of the invention which are obtained when the 17.5 parts of the trisodium salt of the azo compound used in Example 12 are replaced by an equivalent amount of the sodium salt of the dyestuff compound listed in the second column of the table and/or the 11.16 parts of N-methylglucamine used in Example 12 are replaced by an equivalent amount of the polyhydroxyalkylamine listed in the third column of the table. The fourth column of the table indicates the shade obtained on cellulose textile materials when an aqueous solution containing the dyestuff, a resin-forming composition and an acid-catalyst is applied to the textile material which is subsequently heated at a temperature between 140° and 170° C.

| Example | Dyestuff Compound | Polyhydroxyalkylamine | Shade |
|---|---|---|---|
| 13 | 2-[8'-hydroxy-7'-(2''-sulphophenylazo)-3':6'-disulpho-naphth-1'-ylamino]-4:6-dichloro-1:3:5-triazine. | 2-amino-2-hydroxymethyl-1:3-propanediol. | Bluish-red. |
| 14 | do | 1-amino-2:3-propanediol | Do. |
| 15 | 2-[8'-hydroxy-7'-phenylazo-3':6'-disulphonaphth-1'-ylamino]-4:6-dibromo-1:3:5-triazine. | do | Do. |
| 16 | do | N-methylglucamine | Do. |
| 17 | 1-(2':5'-dichloro-4'-sulphophenyl)-3-methyl-4-[5''-(4''':6'''-dichloro-1''':3''':5'''-triazin-2'''-ylamino)-2''-sulphophenyl-azo]-5-pyrazolone. | do | Greenish-yellow. |
| 18 | do | N-ethylglucamine | Do. |
| 19 | 2-[4'-(4''':8''-disulphonaphth-2''-ylazo)-3'-methylphen-ylamino]-4:6-dichloro-1:3:5-triazine. | do | Reddish-yellow. |
| 20 | do | N-methylglucamine | Do. |
| 21 | 2-[5'-hydroxy-6'-(4''-methoxy-2''-sulphophenylazo)-7'-sulpho-naph-2'-ylamino]-4:6-dichloro-1:3:5-triazine. | do | Scarlet. |
| 22 | Copper complex of 2-{6'-[4''-(2''':5'''-disulphophenylazo)-2''-methoxy-5''-methylphenylazo]5'-hydroxy-1':7'-disulphonaphthyl-1'-ylamino}-4:6-dichloro-1:3:5-triazine. | do | Navy blue. |
| 23 | 2-[5'-hydroxy-6'-(2''-sulphophenylazo)-7'-sulphonaphth-2'-ylamino]-4:6-dichloro-1:3:5-triazine. | do | Orange. |
| 24 | Copper complex of 2-[5'-hydroxy-6'-(2''-hydroxy-5''-sulpho-phenylazo-1':7'-disulphonaphth-2'-amino]4:6-dichloro-1:3:5-triazine. | do | Rubine. |
| 25 | 2-[8'-hydroxy-7'-(2''-sulphophenylazo)-3':6'-disulpho-naphth-1'-ylamino]-4:6-dichloro-1:3:5-triazine. | α-D-glucosamine | Bluish-red. |
| 26 | 4-[4'-(4'':6''-dichloro-1''':3''':5''-triazin-2''-ylamino)ani-lino]anthraquinone-2:3':5-trisulphonic acid. | do | Blue. |
| 27 | do | N-methylglucamine | Do. |
| 28 | do | N-ethylglucamine | Do. |

*Example 29.*—A solution of 6.0 parts of N-methylglucamine and 7.15 parts of the trisodium salt of 1-(dichloropyrimidylamino) - 7 - (2' - sulphophenylazo)-8-naphthol - 3:6 - disulphonic acid in 90 parts of water is stirred at a temperature between 78° and 82° C. for 5 hours. The solution is then cooled to 20° C., 1500 parts of ethanol are added and the dyestuff which is precipitated is filtered off, washed with ethanol and dried.

When applied to cellulose textile materials in conjunction with a treatment with an aminoplast precursor and an acid catalyst the dyestuff yields bright red shades which are fast to washing and the coloured cellulose textile materials are resistant to creasing.

The trisodium salt of the azo compound used in the above example may be obtained by the method described in Example 9 of Belgian specification No. 573,299 except that the 17.3 parts of 1-aminobenzene-3-sulphonic acid are replaced by 17.3 parts of orthanilic acid.

*Example 30.*—In place of the 6.0 parts of N-methylglucamine used in Example 29 there are used 3.63 parts of 2-amino-2-hydroxymethyl - 1:3 - propanediol when a similar dyestuff is obtained.

*Example 31.*—A solution of 4.3 parts of N-methylglucamine and 12.28 parts of the disodium salt of the 1:2-chromium complex of 2-(trichloropyrimidylamino) - 6-(2'-carboxyphenylazo) - 5 - naphthol - 7 - sulphonic acid in 200 parts of water is stirred at a temperature between 70° C. and 75° C. for 6 hours, the pH of the solution being maintained between 7 and 9 by the addition of a 10% aqueous solution of sodium carbonate. The solution is then cooled to 20° C., 60 parts of sodium chloride are added and the precipitated dyestuff is filtered off and dried.

The dyestuff so obtained, when applied to cellulose textile materials in conjunction with a resin-forming composition and an acid catalyst yields brown shades which possess good fastness to wet treatments.

*Example 32.*—In place of the 4.3 parts of N-methylglucamine used in Example 31 there are used 4.7 parts of N-ethylglucamine whereby a dyestuff is obtained which contains 4 polyhydroxyalkylamino groups per molecule of dyestuff.

The dyestuff so obtained when applied to cellulose textile materials in conjunction with a resin-forming composition and an acid catalyst yields brown shades which possess good fastness to wet treatments.

*Example 33.*—A solution of 4.3 parts of N-methylglucamine and 16.3 parts of the copper complex of the trisodium salt of 2-methyl-4-chloro-5-nitro-6-[8'-hydroxy-7'-(2'' - sulphophenylazo) - 3':6' - disulphonaphth-1'-yl-amino]-pyrimidine in 250 parts of water is stirred for 3½ hours at 30° C. and then for 8 hours at 60° C., the pH of the solution being maintained between 7 and 9 by the addition of a 10% aqueous solution of sodium carbonate. The solution is then cooled to 20° C. and poured into ethanol. The precipitated dyestuff is then filtered off and dried.

The dyestuff so obtained when applied to cellulose textile materials in conjunction with a resin-forming composition and an acid-catalyst yields purple shades which possess good fastness to washing.

*Example 34.*—A mixture of 4.3 parts of N-methylglucamine, 12.7 parts of the disodium salt of 2-[3'-methyl-4' - (4'':5'' - disulphonaphth-2''-ylazo)-phenylamino]-5-cyano-4:6-dichloropyrimidine and 200 parts of water is stirred for 3 days at a temperature of 80° C., the pH of the solution being maintained between 7 and 9 by the addition of a 10% aqueous solution of sodium carbonate. The solution is cooled to 20° C. and is then poured into ethanol. The precipitated dyestuff is then filtered off and dried. On analysis the dyestuff is found to contain one atom of organically bound chlorine per molecule of dyestuff.

The dyestuff so obtained when applied to cellulose textile materials in conjunction with a resin-forming composition and an acid-catalyst yields yellow shades which have very good fastness to wet treatments and the cellulose textile materials are rendered resistant to creasing.

*Example 35.*—A solution if 16.5 parts of the trisodium salt of 1-amino-4-[4'-(trichloropyrimidylamino)anilino]-anthraquinone-2:3':5-trisulphonic acid (which may be obtained by condensing 2:4:5:6-tetrachloropyrimidine with 1 - amino - 4-[4'-aminoanilino] anthraquinone-2:3':5-trisulphonic acid) and 7.8 parts of N-methylglucamine in 600 parts of water is stirred for 24 hours at a temperature of 90° C. The solution is then filtered and 120 parts of sodium chloride are added to the filtrate. The precipitated dyestuff is then filtered off, washed with water and dried.

The dyestuff so obtained when applied to cellulose textile materials in conjunction with a resin-forming composition and an acid-catalyst yields blue shades which possess excellent fastness to wet treatments and the textile material is resistant to creasing.

The following table gives further examples of the new dyestuffs of the invention which are obtained when the 17.5 parts of the trisodium salt of the azo compound used in Example 1 or 12 is replaced by an equivalent amount of the sodium salt of the dyestuff compound which is obtained by condensing cyanuric chloride with the aminoazo compound listed in the second column of the table and/or the 5.58 parts of N-methylglucamine used in Example 1 or the 11.16 parts of N-methylglucamine used in Example 12 are replaced by the equivalent amounts of the polyhydroxyalkylamine listed in the third column of the table.

The fourth column of the table indicates the shades obtained when the dyestuffs are applied to cellulose textile materials in conjunction with a resin-forming composition and an acid catalyst.

| Example | Aminoazo Compound | Polyhydroxyalkylamine | Shade obtained on cellulose textile materials |
|---|---|---|---|
| 36 | 2-amino-7-(2'-sulphophenylazo)-8-naphthol-6-sulphonic acid. | N-methylglucamine | Orange. |
| 37 | do | N-ethylglucamine | Do. |
| 38 | 2-amino-7-(2'-sulpho-4'-methoxyphenylazo)-8-naphthol-6-sulphonic acid. | 2-amino-2-hydroxy-methyl-1:3-propanediol. | Red. |
| 39 | 2-methylamino-7-(2'-sulpho-4'-methoxphenylazo)-8-naphthol-6-sulphonic acid. | do | Do. |
| 40 | 2-amino-5-hydroxy-6:2'-azonaphthalene-7:1':5'-trisulphonic acid. | do | Orange. |
| 41 | 2-methylamino-5-hydroxy-6:2'-azonaphthalene-7:1':5'-trisulphonic acid. | do | Do. |
| 42 | 1:2-chromium complex of 2-amino-6-(2'-carboxyphenylazo)-5-naphthol 7-sulphonic acid. | do | Brown. |
| 43 | do | N-methylglucamine | Do. |
| 44 | do | N-ethylgucamine | Do. |
| 45 | 4-nitro-4'-(4''-N-methylaminophenylazo) stilbene-2:2'-disulphonic acid. | N-methylglucamine | Reddish-yellow. |
| 46 | 1:2-chromium complex of 6-amino-1:2'-dihydroxy-6'-nitro-2:1'-azonaphthalene-3:4'-disulphonic acid. | do | Black. |
| 47 | 2-(3'-amino-6'-sulphophenylazo)-1-naphthol-3:6-disulphonic acid. | do | Reddish-orange. |
| 48 | 2-amino-6-(3'-amino-6'-sulphophenylazo)-5-naphthol-7-sulphonic acid. | do | Orange. |
| 49 | 2-amino-6-[2'-sulpho-4'-(4''-sulphophenylazo) phenylazo]-5-naphthol-7-sulphonic acid. | do | Red. |
| 50 | 2-amino-5-hydroxy-6:2'-azonaphthalene-7:4':8'-trisulphonic acid. | do | Scarlet. |
| 51 | 2-amino-5-hydroxy-6:2'-azonaphthalene-7:5':7'-trisulphonic acid. | do | Do. |
| 52 | 2-(4'-amino-3'-sulphophenylamino)-6-[2''-sulpho-4''-(p-sulphophenylazo)phenylazo]-5-naphthol-7-sulphonic acid. | do | Violet. |
| 53 | 2-amino-7-(3'-amino-6'-sulphophenylazo)-8-naphthol-6-sulphonic acid. | do | Reddish-orange. |
| 54 | 2-amino-8-hydroxy-7:2'-azonaphthalene-6:4':8'-trisulphonic acid. | do | Red. |
| 55 | 2-amino-8-hydroxy-7:2'-azonaphthalene-6:1':5'-trisulphonic acid. | do | Do. |
| 56 | 1-amino-7-(3'-sulphophenylazo)-8-naphthol-3:6-disulphonic acid. | do | Bluish red. |
| 57 | 1-amino-7-(2'-sulpho-4'-chlorophenylazo)-8-naphthol-3:6-disulphonic acid. | do | Do. |
| 58 | 1-amino-7-(2'-sulpho-4'-methoxyphenylazo)-8-naphthol-3:6-disulphonic acid. | do | Rubine. |
| 59 | 1-amino-7-(3'-amino-6'-sulphophenylazo)-8-naphthol-3:6-disulphonic acid. | do | Bluish-red. |
| 60 | 1-amino-7-(2'-sulphophenylazo)-8-naphthol-4:6-disulphonic acid. | do | Red. |
| 61 | 1-amino-8-hydroxy-7:2'-azonaphthalene-3:6:1'-trisulphonic acid. | do | Rubine. |
| 62 | 1-amino-7-(4'-sulphophenylazo)-8-naphthol-4:6-disulphonic acid. | do | Bluish-red. |
| 63 | 2-(2'-acetylamino-4'-aminophenylazo) naphthalene-4:8-disulphonic acid. | do | Reddish-yellow. |
| 64 | 2-(2'methyl-4'-aminophenylazo)naphthalene-5:7-disulphonic acid. | do | Do. |
| 65 | 2-[2'-methyl-4'-(4''-amino-2''-phenylazo)phenylazo]naphthalene-4:8-disulphonic acid. | do | Brownish-orange. |
| 66 | 1-(2'-sulphophenyl)-3-methyl-4-(3''-amino-6''-sulphophenylazo)-5-pyrazolone. | do | Yellow. |
| 67 | 1-(3'-aminophenyl)-3-methyl-4-(1'':5''-disulphonaphthyl-2''-azo)-5-pyrazolone. | do | Do. |
| 68 | 1-(4'-aminophenyl)-3-methyl-4-(1'':5''-disulphonaphthyl-2''-azo)-5-pyrazolone. | do | Do. |
| 69 | 1-(3'-amino-4'-sulphophenyl)-3-methyl-4-(1''-sulphonaphthyl-2''-azo)-5-pyrazolone. | do | Do. |
| 70 | 1-(4':8'-disulphonaphth-2'-yl)-3-methyl-4-(3''-amino-6''-sulphophenylazo)-5-pyrazolone. | do | Do. |
| 71 | 1-(3'-amino-6'-sulphophenylazo)-2-naphthol-6-sulphonic acid. | do | Orange. |
| 72 | 1-(3'-amino-6'-sulphophenylazo)-2-naphthol-6:8-disulphonic acid. | do | Do. |
| 73 | 2-(3'-amino-6'-sulphophenylazo)-1-naphthol-3-sulphonic acid. | N-ethylglucamine | Do. |
| 74 | 2-(3'-amino-6'-sulphophenylazo)-1:8-dihydroxy-naphthalene-3:6-disulphonic acid. | do | Bluish-red. |
| 75 | 1-(3'-amino-6'-sulphophenylazo)-2-amino-8-naphthol-6-sulphonic acid. | do | Red. |
| 76 | 1-acetylamino-7-(3'-amino-6'-sulphophenylazo)-8-naphthol-3:6-disulphonic acid. | N-methylglucamine | Do. |
| 77 | 1-acetylamino-7-(3'-amino-6'-sulphophenylazo)-8-naphthol-4:6-disulphonic acid. | do | Do. |
| 78 | 1-benzoylamino-7-(3'-amino-6'-sulphophenylazo) 8-naphthol-3:6-disulphonic acid. | do | Do. |
| 79 | 2-propionylamino-6-(3'-amino-6'-sulphophenylazo)-5-naphthol-7-sulphonic acid. | do | Yellowish-red. |
| 80 | 2-benzoylamino-6-(3'-amino-6'-sulphophenylazo)-5-naphthol-7-sulphonic acid. | N-n-propylglucamine | Do. |
| 81 | 2-amino-7-(3'-amino-6'-sulphophenylazo)-8-naphthol-6-sulphonic acid. | do | Do. |
| 82 | 1-(4'-amino-2'-sulphophenylazo)-2-naphthol-8-sulphonic acid. | do | Red. |
| 83 | 2-acetylamino-6-(4'-amino-2'-sulphophenylazo)-5-naphthol-7-sulphonic acid. | N-β-hydroxyethyl-glucamine. | Yellowish-red. |
| 84 | 2-acetylamino-7-(4'-amino-2'-sulphophenylazo)-8-naphthol-6-sulphonic acid. | do | Red. |

| Example | Aminoazo Compound | Polyhydroxyalkylamine | Shade obtained on cellulose textile materials |
|---|---|---|---|
| 85 | 1-(4'-amino-2'-sulphophenylazo)-2-amino-8-naphthol-6-sulphonic acid. | N-β-hydroxyethylglucamine. | Bluish-red. |
| 86 | 1-acetylamino-7-(4'-amino-2'-sulphophenylazo)-8-naphthol-3:6-disulphonic acid. | 1-aminopropane-2:3-diol | Violet. |
| 87 | 1-benzoylamino-7-(4'-amino-2'-sulphophenylazo)-8-naphthol-4:6-disulphonic acid. | do | Bordeaux. |
| 88 | 1-(3'-aminophenyl)-3-methyl-4-(2'':5''-disulphophenylazo)-5-pyrazolone. | do | Yellow. |
| 89 | 1-(3'-aminobenzoylamino)-7-(2'-sulphophenylazo)-8-naphthol-3:6-disulphonic acid. | do | Red. |
| 90 | 1-(4'-aminosulphonaphth-1'-ylazo)-4-(8''-sulphonaphth-1'''-ylazo)naphthalene sulphonic acid. | do | Reddish-brown. |
| 91 | 1-amino-2-(4'-aminophenylazo)-7-(4''-sulphophenylazo)-8-naphthol-3:6-disulphonic acid. | do | Green. |
| 92 | 1-(4'-aminobenzoylamino)-7-(2''-sulphophenylazo)-8-naphthol-3:6-disulphonic acid. | do | Red. |
| 93 | 2-methylamino-5-hydroxy-6-(2'-carboxyphenylazo)naphthalene-7-sulphonic acid. | N-methylglucamine | Orange. |

*Example 94.*—A mixture of 9.9 parts of the tetrasodium salt of the 1:2-chromium complex of 2:4-dichloro-6-[8'-hydroxy - 7' - (5''-chloro-2''-hydroxyphenylazo)-3':6'-disulphonaphth-1'-ylamino]-1:3:5-triazine (which is obtained by reacting the tetrasodium salt of the 1:2-chromium complex of 1-amino-7(5'-chloro-2'-hydroxyphenylazo)-8-naphthol-3:6-disulphonic acid with cyanuric chloride), 3.07 parts of N-methylglucamine and 200 parts of water is stirred for 24 hours at a temperature of 20° C., the pH of the solution being maintained between 7 and 9 by the gradual addition of 7.5 parts of a 10% aqeuous solution of sodium carbonate. The resulting solution is then evaporated to dryness. On analysis the dyestuff is found to contain 2 organically bound chlorine atoms per molecule of dyestuff.

The dyestuff so obtained when applied to cellulose textile materials in conjunction with a resin-forming composition and an acid catalyst yields blue shades which possess excellent fastness to wet treatments.

*Example 95.*—If the 3.07 parts of N-methylglucamine used in Example 94 are replaced by 6.14 parts of N-methylglucamine and the temperature of reaction is raised from 20° C. to 65° C. a dyestuff is obtained which has similar dyeing properties to the dyestuff of Example 94 but which contains no organically bound chlorine atoms.

The following table gives further examples of the new dyestuffs of the invention which are obtained when the 9.9 parts of the tetrasodium salt of the chromium complex used in Example 94 or 95 is replaced by an equivalent amount of the sodium salt of the metal complex listed in the second column of the table. The third column of the table indicates the shades obtained when the dyestuffs are applied to cellulose textile materials in conjunction with a resin-forming composition and an acid catalyst.

| Example | Metal Complex | Shade |
|---|---|---|
| 96 | 1:2-chromium complex of 2:4-dichloro-6-[8'-hydroxy-7'-(5''-nitro-2''-hydroxyphenylazo)-3':6'-disulphonaphth-1'-ylamino]-1:3:5-triazine. | Greenish-blue. |
| 97 | 1:2-chromium complex of 1-[3'-(4'':6''-dichloro-1''':3''':5'''-triazin-2'''-ylamino)phenyl]-3-methyl-4-(2''-carboxy-4''-sulphophenylazo)-5-pyrazolone. | Yellowish-orange. |
| 98 | 1:2-chromium complex of 2:4-dichloro-6-[3'-hydroxy-4'-(1''-hydroxy-8''-phenylamino-3''':6''-disulphonaphth-2''-ylazo) phenylamino]-1:3:5-triazine. | Bluish-green. |

*Example 99.*—A mixture of 27.5 parts of the dyestuff of Example 93, 4.6 parts of cobaltous acetate and 500 parts of water is stirred for 20 hours at 20° C. 125 parts of sodium chloride are then added and the precipitated dyestuff is filtered off and dried.

When applied to cellulose textile materials in conjunction with a resin-forming composition and an acid catalyst dyestuff yields brown shades which possess excellent fastness to wet treatments and the cellulose textile material is rendered resistant to creasing.

*Example 100.*—A mixture of 13.75 parts of the dyestuff of Example 93, 2.4 parts of chromium triacetate and 250 parts of water is stirred at the boil under a reflux condenser for 1½ hours. 65 parts of sodium chloride are then added, the solution is cooled to 20° C. and the dyestuff which is precipitated is filtered off and dried.

When applied to cellulose textile materials in conjunction with a resin-forming composition and an acid catalyst the dyestuff yields maroon shades which possess excellent fastness to wet treatments and the cellulose textile materials are rendered resistant to creasing.

*Example 101.*—A mixture of 6.54 parts of the disodium salt of 2-chloro-4-methoxy-6-[5'-hydroxy-6-(4''-methoxy-2''-sulphophenylazo)-7'-sulphonaphth - 2' - yl-N-methylamino]-1:3:5-triazine, 2 parts of N-methylglucamine and 200 parts of water is stirred for 1 hour at a temperature between 60° and 65° C., the pH of the solution being maintained between 7 and 9 by the addition of a 10% aqueous solution of sodium carbonate. 40 parts of sodium chloride are then added, the solution is cooled to 20° C., and the precipitated dyestuff is filtered off and dried.

When applied to cellulose textile materials in conjunction with a resin-forming composition and an acid-catalyst the dyestuff yields scarlet shades which possess excellent fastness to wet treatments.

*Example 102.*—A mixture of 7.33 parts of the trisodium salt of 2 - chloro-4-phenylamino-6-[8'-hydroxy-7'-(2'' - sulphophenylazo) - 3':6' - disulphonaphth-1'-ylamino]-1:3:5-triazine, 2 parts of N-methylglucamine and 200 parts of water is stirred for 1 hour at a temperature between 80° C. and 85° C. the pH of the resulting solution being maintained between 7 and 9 by the addition of a 10% aqueous solution of sodium carbonate. 20 parts of sodium chloride are then added, the solution is cooled to 20° C. and the precipitated dyestuff is filtered off and dried.

When applied to cellulose textile materials in conjunction with a resin-forming composition and an acid-catalyst the dyestuff yields bluish-red shades which possess excellent fastness to wet treatments.

*Example 103.*—A mixture of 15.9 parts of the disodium salt of 1-(2':5'-dichloro-4'-sulphophenyl)-3-methyl-4-]2''-sulpho-5''-(2'''-chloro-4'''-methoxy - 1''':3''':5'''-trazine - 6''' - ylamino) - phenylazo] - 5 - pyrazolone, 5.9 parts of N-methylglucamine and 150 parts of water is stirred for 2 hours at a temperature between 60° and 70° C., the pH of the solution being maintained between 7 and 9 by the gradual addition of a 10% aqueous solution of sodium carbonate. 25 parts of a concentrated aqueous solution of hydrochloric acid and 35 parts of potassium chloride are then added, the solution is cooled to 40° C. and the precipitated solid is filtered off. The solid so obtained is mixed with 2.3 parts of sodium carbonate and the mixture is then dried.

When applied to cellulose textile materials in conjunction with a resin-forming composition and an acid catalyst the dyestuff yields yellow shades which have excellent fastness to wet treatments.

*Example 104.*—A solution of 26.7 parts of the dyestuff of Example 6 in 200 parts of a 4% aqueous solution of sodium hydroxide is stirred at the boil under a reflux condenser for 2½ hours. The solution is then cooled to 20° C., and the pH is adjusted to 7 by the addition of a concentrated aqueous solution of hydrochloric acid. 1000 parts of acetone are then added and the precipitated dyestuff is separated and dried.

When applied to cellulose textile materials in conjunction with a resin-forming composition and an acid catalyst the dyestuff yields yellow shades which have excellent fastness to wet treatments.

*Example 105.*—A solution of 9.1 parts of the disodium salt of 1-amino-8-naphthol-3:6-disulphonic acid in 100 parts of water is added with stirring to a suspension of 5.1 parts of cyanuric chloride in a mixture of 35 parts of acetone, 100 parts of ice and 100 parts of water. The mixture is stirred for ½ hour at a temperature between 0° and 5° C., 2.25 parts of N-methylglucamine hydrochloride are then added and the mixture is stirred for 2 hours at a temperature between 30° and 35° C., the pH of the resulting solution being maintained between 4.5 and 5 by the addition of an aqueous solution of sodium carbonate. The solution is then cooled to 5° C., 20 parts of sodium acetate are added and an aqueous suspension of diazotised orthanilic acid (which is obtained by diazotising 4.9 parts of orthanilic acid by known methods) is added. The resulting mixture is stirred for 1 hour, sodium carbonate is then added until the pH of the mixture is 7, and the mixture is stirred for 16 hours. The resulting solution is poured into a saturated solution of potassium acetate in ethanol and the precipitated dyestuff, which is identical to the dyestuff of Example 1, is filtered off and dried.

*Example 106.*—A mixture of 10.9 parts of the dyestuff of Example 1, 5.3 parts of the sodium salt of metanilic acid, 1.6 parts of sodium carbonate and 250 parts of water is stirred at the boil under a reflux condenser for 20 hours. The resulting solution is cooled to 20° C. and poured into ethanol. The precipitated dyestuff is then filtered off and dried.

When applied to a cellulose textile material in conjunction with a resin-forming composition and an acid catalyst the dyestuff yields bluish-red shades which have excellent fastness to wet treatments and the cellulose textile material is rendered resistant to creasing.

In place of the 5.3 parts of the sodum salt of metanilic acid used in the above example there are used equivalent amounts of the sodium salts of orthanilic acid, p-aminobenzene sulphonic acid, aniline-3:5-disulphonic acid or anthranilic acid when similar dyestuffs are obtained.

*Example 107.*—115.2 parts of copper phthalocyanine are dissolved in 600 parts of chlorosulphonic acid and the resulting solution is stirred for 3 hours at a temperature of 135° and 140° C. The solution is then cooled to 80° C., 100 parts of thionyl chloride are added during 1 hour and the resulting mixture is stirred for 2 hours at a temperature of 80° to 85° C. The mixture is then cooled to 20° C., poured into a mixture of ice and water and the precipitated sulphonchloride is filtered off. The sulphonchloride is stirred with 600 parts of ice and 1000 parts of water and 30 parts of p-aminoacetanilide are added. The mixture is then stirred at 50° C. and a 2 N aqueous solution of ammonium hydroxide is added to maintain the pH of the mixture at 8. When no further additions of the ammonium hydroxide solution are required to maintain the pH at 8, 580 parts of a concentrated aqueous solution of hydrochloric acid are added and the mixture is stirred for 4 hours at a temperature of 90° C. The precipitated solid is then filtered off, washed with a 1% aqueous solution of hydrochloric acid and dried.

19.7 parts of the so obtained copper phthalocyanine-3-N - (4' - aminophenyl)sulphonamide - sulphonamide sulphonic acid are stirred in 500 parts of water and a N aqueous solution of sodium hydroxide is added until the pH of the resulting solution is 7. 3.7 parts of 2:4:6-trichloropyrimidine are then added and the mixture is stirred at 55° to 60° C., the pH of the mixture being maintained between 6 and 7 by the addition of a N aqueous solution of sodium hydroxide. 12 parts of β:γ-dihydroxypropylamine are then added and the mixture is stirred for 18 hours at a temperature between 90° and 95°. The mixture is then cooled to 20° C., 100 parts of potassium acetate are added and the precipitated dyestuff is filtered off and dried.

When applied to cellulose textile material in conjunction with a resin-forming composition and an acid catalyst the dyestuff yields bright blue shades which possess excellent fastness to wet treatments.

If the 12 parts of β:γ-dihydroxypropylamine used in the above example are replaced by 16 parts of N-methylglucamine then a similar dyestuff is obtained.

*Example 108.*—18 parts of the copper phthalocyanine-3 - N - (4'-aminophenyl)sulphonamide-sulphonamide sulphonic acid (which is obtained as described in Example 107) are stirred in 800 parts of water and a N aqueous solution of sodium hydroxide is added until the pH of the resulting solution is 7. A solution of 4 parts of 5-carbo-methoxy-2:4-dichloropyrimidine (which is obtained as described in volume 20 of the Journal of Organic Chemistry at page 837) in 50 parts of dioxan is then added and the mixture is stirred at 30° C. until no further additions of a N aqueous solution of sodium hydroxide are required to maintain the pH between 6 and 7. 3.6 parts of N-methylglucamine are then added and the mixture is stirred at 90° C. until no further additions of the sodium hydroxide solution are required to maintain the pH between 6.8 and 7. The mixture is then cooled to 20° C., 200 parts of potassium acetate are added, and the precipitated dyestuff is filtered off and dried.

When applied to cellulose textile materials in conjunction with a resin-forming composition and an acid-catalyst the dyestuff yields bright blue shades which possess excellent fastness to wet treatments.

*Example 109.*—20 parts of copper phthalocyanine-3-N-(4' - amino - 3' - sulphophenyl)sulphonamide - sulphonamide sulphonic acid are stirred with 800 parts of water and a N aqueous solution of sodium hydroxide is added until the pH of the resulting solution is 7. A solution of 4.3 parts of 5-cyano-2:4:6-trichloropyrimidine in 75 parts of dioxan is added and the mixture is stirred at 40° C. until no further additions of a N aqueous solution of sodium hydroxide are required to maintain the pH between 6 and 7. 4 parts of N-methylglucamine are then added and the mixture is stirred at 75° C. until no further additions of a N aqueous solution of sodium hydroxide are required to maintain the pH between 6.5 and 7.0. The mixture is cooled to 20° C., 300 parts of potassium acetate are added and the precipitated dyestuff is filtered off and dried.

When applied to cellulose textile materials in conjunction with a resin-forming composition and an acid catalyst the dyestuff yields bright blue shades which possess excellent fastness to wet treatments.

*Example 110.*—A mixture of an aqueous solution of the sodium salt of copper phthalocyanine-4-N-[3'-(4":6"-dichloro - 1":3":5"-triazin-2"-ylamino)-4'-sulphophenyl] sulphonamide sulphonic acid, which is obtained as described below, and 12 parts of β:γ-dihydroxypropylamine is heated at a temperature of 90° C. to 100° C. for 30 minutes. The mixture is then cooled to 20° C. and acidified by the addition of a concentrated aqueous solution of hydrochloric acid. The precipitated solid is then filtered off and the press cake so obtained is suspended in 1000 parts of water and a 2 N aqueous solution of sodium hydroxide is added until the pH of the mixture is 7. The resulting solution is then evaporated to dryness when the dyestuff is obtained in the form of a deep blue powder.

When an aqueous solution of the dyestuff, a resin-forming composition and an acid catalyst is applied to cellulose textile materials, the cellulose textile material dried and then cured at a temperature of 140° C. for 4 minutes, the cellulose textile material is coloured a bright blue shade possessing excellent fastness to light, to washing and to perspiration.

The aqueous solution of the sodium salt of the copper phthalocyanine - 4 - N-[3'-(4'':6''-dichloro-1'':3'':5''-triazin - 2'' - ylamino) - 4'-sulphophenyl)sulphonamide sulphonic acid used in the above example may be obtained as described in Example 3 of British specification No. 805,562 starting from 13.0 parts of copper phthalocyanine - 4 - N(3' - amino-4'-sulphophenyl)sulphonamide sulphonic acid and 3.1 parts of cyanuric chloride.

*Example 111.*—A mixture of an aqueous solution of the sodium salt of copper phthalocyanine-4-N-[3'-(4'':6''-dichloro - 1'':3'':5''-triazin-2''-ylamino)-4'-sulphophenyl] sulphonamide sulphonic acid (which is obtained as described in Example 110) and 3.4 parts of N-methylglucamine is stirred at a temperature between 35° and 40° C. until no further additions of a 2 N aqueous solution of sodium carbonate are required to maintain the pH of the mixture between 7.0 and 7.5. 250 parts of potassium acetate are then added and the precipitated dyestuff is filtered off and dried.

When applied to cellulose textile materials in conjunction with a resin-forming composition and an acid catalyst the dyestuff yields bright blue shades possessing excellent fastness to wet treatments.

A similar dyestuff is obtained when the 3.4 parts of N-methylglucamine used in the above example are replaced by 3.75 parts of glucosamine hydrochloride.

*Example 112.*—A mixture of an aqueous solution of the sodium salt of copper phthalocyanine 4-N-[3'-(4'':6''-dichloro - 1'':3'':5'' - triazin - 2'' - ylamino) - 4' - sulphophenyl]sulphoanamide sulphonic acid (which is obtained as described in Example 110) and 6.8 parts of N-methylglucamine is stirred at a temperature of 40° C. until no further additions of a 2 N aqueous solution of sodium carbonate are required to maintain the pH between 7 and 7.5, and the mixture is then stirred at a temperature of 90° C. until no further additions of a 2 N aqueous solution of sodium carbonate are required to maintain the pH between 7.5 and 8. The resulting solution is then evaporated to dryness.

The dyestuff so obtained when applied to cellulose textile materials in conjunction with a resin-forming composition and an acid catalyst yields bright blue shades which possess excellent fastness to wet treatments.

A similar dyestuff is obtained when the 6.8 parts of N-methylglucamine used in the above example are replaced by 7.5 parts of glucosamine hydrochloride.

*Example 113.*—In place of the aqueous solution of the sodium salt of copper phthalocyanine-4-N-[3'-(4'':6''-dichloro - 1'':3'':5'' - triazin - 2'' - ylamino) - 4' - sulphophenyl]sulphonamide sulphonic acid used in Examples 110, 111 and 112 there is used an aqueous solution of the sodium salt of copper phthalocyanine-4-N-[4'-(4'':6''-dichloro - 1'':3'':5'' - triazin - 2'' - ylamino) - 3' - sulphophenyl]sulphonamide sulphonic acid, or an aqueous solution of the sodium salt of copper phthalocyanine-4-N-{4'-[N' - β - hydroxyethyl - N' - (4'':6'' - dichloro - 1'':3'':5'' - triazin - 2'' - yl)]amino - 3' - sulphophenyl}sulphonamide sulphonic acid, or an aqueous solution of the sodium salt of copper phthalocyanine-4-N-{4'-[N'-methyl - N' - (4'':6'' - dichloro - 1'':3'':5'' - triazin - 2''-yl)]amino-3'-sulphophenyl}sulphonamide sulphonic acid, or an aqueous solution of the sodium salt of copper phthalocyanine - 4 - N - [3' - (4'':6'' - dichloro - 1'':3'':5'' - triazin - 2''ylamino) - 6' - methyl - 4' - sulphophenyl]sulphonamide sulphonic acid when similar dyestuffs are obtained.

The said aqueous solutions may themselves be obtained by the method described in the first paragraph of Example 3 of British specification No. 805,562 except that the 3.7 parts of cyanuric chloride are replaced by 3.1 parts of cyanuric chloride and that the 11.05 parts of copper phthalocyanine - 4 -N - (3' - amino - 4' - sulphophenyl) sulphonamide sulphonic acid are replaced by 13 parts of copper phthalocyanine-4-N-(4'-β-hydroxyethylamino-3'-sulphophenyl)sulphonamide sulphonic acid or by 12.5 parts of copper phthalocyanine-4-N-(4'-methylamino-3'-sulphophenyl)sulphonamide sulphonic acid or by 12.5 parts of copper phthalocyanine-4-N-(3'-amino-6'-methyl-4'-sulphophenyl)sulphonamide sulphonic acid respectively.

*Example 114.*—In place of the aqueous solution of the sodium salt of copper phthalocyanine-4-N-[3'-(4'':6''-dichloro - 1'':3'':5'' - triazin - 2'' - ylamino) - 4' - sulphophenyl]sulphonamide sulphonic acid used in Examples 110, 111 and 112 there is used an aqueous solution of the sodium salt of copper phthalocyanine-3-N-[4'-(4'':6''-dichloro - 1'':3'':5'' - triazin - 2'' - ylamino)phenyl]sulphonamide-sulphonamide sulphonic acid whereby similar dyestuffs are obtained.

The said aqueous solution may itself be obtained by condensing 19.7 parts of copper phthalocyanine-3-N-(4'-aminophenyl)sulphonamide-sulphonamide sulphonic acid (which is obtained as described in Example 107) with cyanuric chloride in aqueous medium.

What we claim is:

1. Compounds having the formula:

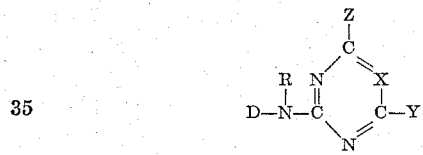

wherein:

D is the radical of water-soluble chromophoric dyestuff radical selected from the class consisting of sulfo- and carboxy-substituted azo, anthraquinone, and phthalocyanine chromophoric dyestuff radical, having the nitrogen atom attached to a carbon atom of the dyestuff radical;

R is a member of the group consisting of hydrogen and lower alkyl radicals;

X is a member of the group consisting of =N—, =CH—, =CCL—, =C(CN)—, =C(NO₂)—, and =C(CO₂CH₃)—;

Y is a member of the group consisting of hydrogen, methyl, amino, methoxy, anilino, hydroxyl, sulphonated anilino, carboxyanilino, chlorine, and the radical represented by Z; and, Z represents an N-lower alkyl-pentahydroxyhexylamino radical.

2.

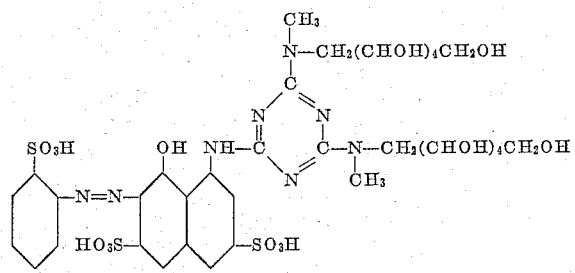

References Cited in the file of this patent

UNITED STATES PATENTS

| | | |
|---|---|---|
| 1,886,480 | Haller et al. | Nov. 8, 1932 |
| 2,140,987 | Dickey | Dec. 20, 1938 |
| 2,206,099 | McNalley et al. | July 2, 1940 |

(Other references on following page)

UNITED STATES PATENTS

| | | |
|---|---|---|
| 2,216,446 | McNalley et al. | Oct. 1, 1940 |
| 2,224,144 | Dickey | Dec. 10, 1940 |
| 2,226,199 | Dickey | Dec. 24, 1940 |
| 2,231,706 | Dickey | Feb. 11, 1941 |
| 2,332,047 | Bock et al. | Oct. 19, 1943 |
| 2,339,739 | Blackshaw et al. | Jan. 18, 1944 |
| 2,350,188 | Pinkney | May 30, 1944 |
| 2,643,996 | Widmer et al. | June 30, 1953 |
| 2,728,761 | Wallace et al. | Dec. 27, 1955 |
| 2,795,576 | Fasciati | June 11, 1957 |
| 2,889,316 | Heckendorf et al. | June 2, 1959 |
| 2,945,021 | Fasciati et al. | July 12, 1960 |
| 2,951,072 | Tilley et al. | Aug. 30, 1960 |
| 2,953,560 | Baker et al. | Sept. 20, 1960 |
| 2,964,520 | Baker et al. | Dec. 13, 1960 |
| 2,979,498 | Andrew et al. | Apr. 11, 1961 |